United States Patent [19]

Endo

[11] Patent Number: 4,982,301

[45] Date of Patent: Jan. 1, 1991

[54] MAGNETIC HEAD FOR PERPENDICULAR MAGNETIC RECORDING SYSTEM AND PROCESS

[75] Inventor: Kazuo Endo, Santa Cruz, Calif.

[73] Assignee: Seagate Technology, Inc., Scotts Valley, Calif.

[21] Appl. No.: 515,543

[22] Filed: Apr. 26, 1990

Related U.S. Application Data

[63] Continuation of Ser. No. 115,423, Oct. 30, 1987, abandoned.

[51] Int. Cl.$^5$ .................. G11B 5/127; G11B 5/235
[52] U.S. Cl. ............................ 360/125; 360/120
[58] Field of Search ................. 360/125–127, 360/119–120, 122

[56] References Cited

U.S. PATENT DOCUMENTS

| | | | |
|---|---|---|---|
| 4,625,250 | 11/1986 | Shibata | 360/125 |
| 4,636,897 | 1/1987 | Nakamura et al. | 360/125 |
| 4,763,215 | 8/1988 | Gueugnon et al. | 360/125 |
| 4,839,761 | 6/1989 | Gatzen | 360/103 |

FOREIGN PATENT DOCUMENTS

| | | | |
|---|---|---|---|
| 59-96517 | 6/1984 | Japan | 360/113 |
| 62-99903 | 5/1987 | Japan | 360/119 |

*Primary Examiner*—John H. Wolff
*Attorney, Agent, or Firm*—Flehr, Hohbach, Test, Albritton & Herbert

[57] ABSTRACT

A read/write head for use in recording and reading data on perpendicular recording media comprising a first elongate magnetic member and a second U-shaped member having a base member and two leg members, said base member being parallel to said elongate member and said leg members being supported by and integral with said base member and extending toward said elongate member, one of said leg members being longer than the other shorter of said leg members, whereby said first elongate magnetic member and said second U-shaped member are secured together with an open gap portion defined between the other shorter leg of said second U-shaped member and said first elongate magnetic member, said gap portion being adapted to be proximate to said recording medium during use of said read/write head, said first elongate member comprising a magnetic member having an elongate layer of magnetic material carried on and extending longitudinally along a face of said first elongate magnetic member and terminating proximate said recording medium in a pole tip end having a width and thickness operable to establish the resolution of the head when said head is used for accessing said information, said first elongate magnetic member terminating in a region having a narrowed end slanted in part toward said pole tip, whereby when driven by a write current, said narrowed end of said first elongate magnetic member will saturate magnetically leaving said pole tip end as the only effective recording surface of said head.

6 Claims, 3 Drawing Sheets

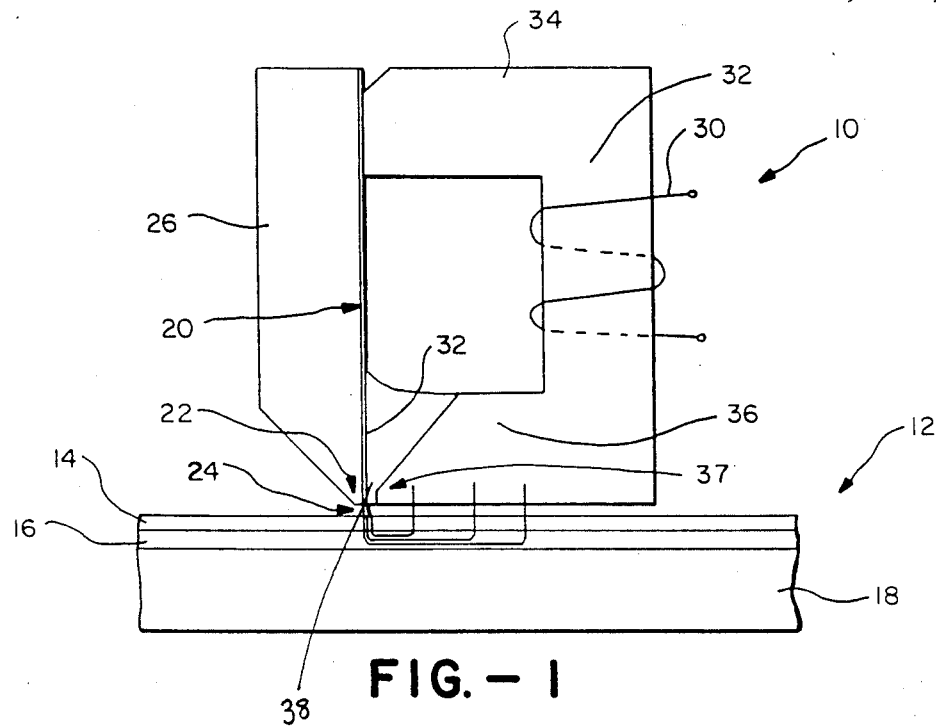
FIG. — 1
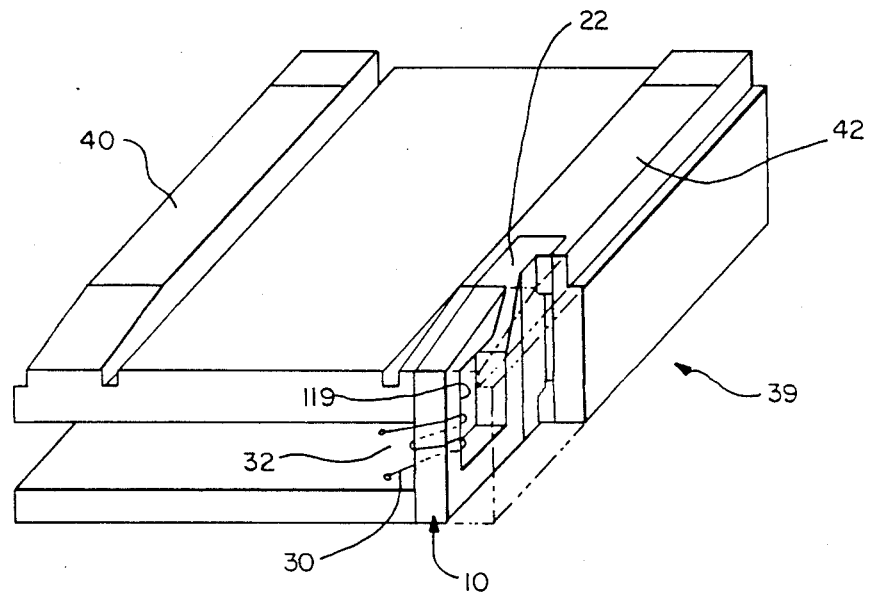
FIG. — 2

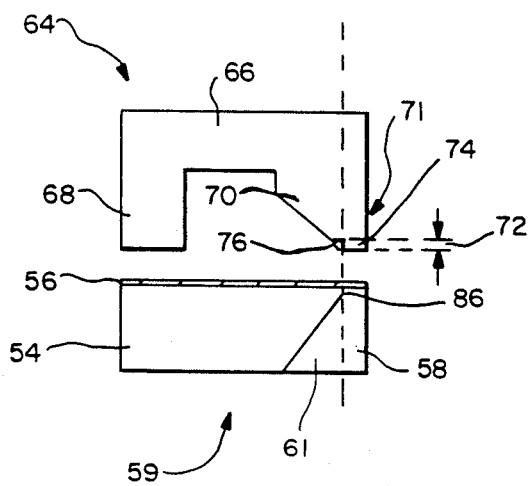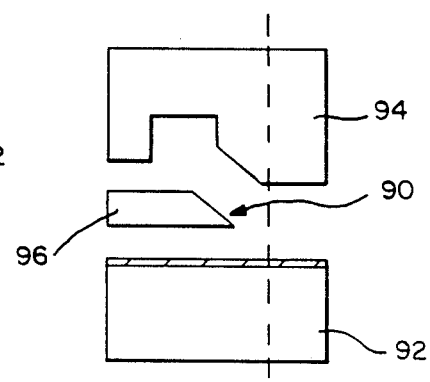
FIG.-3A    FIG.-3B
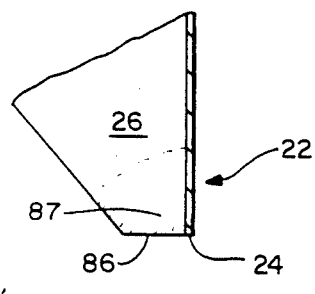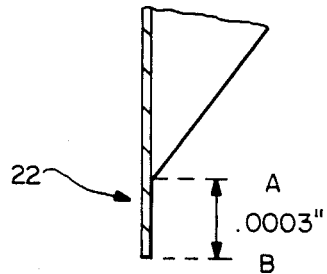
FIG.-3C    FIG.-3D

MAGNETIC HEAD FOR PERPENDICULAR MAGNETIC RECORDING SYSTEM AND PROCESS

This is a continuation of application Ser. No. 115,423, filed on Oct. 30, 1987, now abandoned.

CROSS REFERENCE TO RELATED APPLICATION

This invention constitutes an improvement over the invention described in U.S. application Ser. No. 080,063 filed July 31, 1987, entitled "Magnetic Head for Perpendicular Magnetic Recording System" invented by H. Gatzen, assigned to the Assignee of this invention, and incorporated herein by reference.

BACKGROUND OF THE INVENTION generally to a magnetic head for a

This invention relates perpendicular- recording system, and more particularly to a thin film magnetic head which is especially adapted for recording on double-sided/double-layer disc or media, and a process for forming that head.

In conventional magnetic recording media, data is recorded by magnetizing the magnetic layer of the media in a longitudinal direction parallel to the direction of relative movement between the magnetic medium and the transducer, or head, positioned adjacent to the medium. In perpendicular recording, data is recorded by magnetizing the magnetic recording layer in the direction perpendicular to the surface of the medium.

Magnetic recording transducers generally fall into two classes: ring-type heads that employ magnetic material generally in the shape of a ring for defining a magnetic path, the ring having a gap therein for defining the location of the data recorded, and single pole piece heads that employ an elongated strip of high saturation flux density material to link the magnetic flux being sensed by the head with an operatively associated coil. In ring-type heads, as noted above, the resolution of the head is a function of the length of the gap, whereas in single pole piece heads, the resolution is a function of the thickness of the pole piece at its tip.

Ring-type heads have long been used in longitudinal recording and have also been proposed for use in perpendicular recording. However, since a major advantage of perpendicular recording is the ability to read and write data at high density, the use of ring-type heads in perpendicular recording has not been considered advantageous because the pulse widths obtained with ring-type heads tend to lead to peak shift problems at high density. Further, ring-type heads often provide asymmetric pulse shapes and in general give rise to difficulties in reading and writing at ultra high densities. Ring-type heads as now known cannot be used with all perpendicular recording media.

Single pole piece heads offer the advantage of high resolution if the pole piece is made by thin film deposition techniques. With thin film deposition, pole pieces of less than one micron thickness can be obtained, which would enable the head to read information stored at very high densities. However, there has not yet been developed commercially acceptable methods of making and using a high volume thin film single pole piece head for perpendicular recording.

SUMMARY OF THE INVENTION

Therefore, it is an objective of this invention to provide an improved magnetic head suitable for use in perpendicular magnetic recording.

It is a further objective herein to provide a head suitable for vertical magnetic recording that is relatively simple to fabricate on a practical and reliable basis.

It is another objective to provide a perpendicular magnetic recording head that can be handled and used under normal conditions without special precautions.

Yet another objective is to provide a perpendicular magnetic recording head that can be accurately positioned over a location to be accessed on the storage media.

Another objective herein is to provide a vertical magnetic recording head in which the main pole includes a thin film layer of magnetic material as the read/write pole piece, thereby providing a main pole that is relatively thin so that the horizontal extent of each recorded bit is very limited, thereby maximizing the density of the recorded data.

Yet another objective is to provide a vertical magnetic recording head that is relatively easily incorporated into disc drives by supporting it on a slider of the type already known and developed in the disc drive art.

A further objective herein is to provide a vertical magnetic recording head incorporating a thin film pole piece capable of being adapted to reliable mass production techniques so that significant volumes of the heads may be fabricated.

These and other objectives are achieved in a disc drive incorporating a non-magnetic slider supporting a read/ write head for use in reading and recording data on perpendicular magnetic recording media, the head comprising a first elongate member of magnetic material having a thin film pole piece extending longitudinally along the face thereof, the pole piece terminating at the end of the elongate member and proximate the recording media in a pole tip end that has a width and thickness operable to establish the resolution of the head when the head is used for recording or accessing the information, the head further comprising a second U-shaped member having a base member and two legs, one of the legs being fastened to the upper end of the elongate magnetic member, and the second end being positioned a short distance from the pole tip end of the thin film magnetic pole, the leg of the U-shaped member functioning as a flux collector, its spacing from the pole tip end defining the recording gap.

To facilitate the construction of the magnetic head, the U-shaped member is initially formed with a portion of the lower leg incorporating a step or a spacer deposited with thin film deposition technique Which may be fastened below the region of the thin film which is to function as the pole tip end. Selection of method depends on dimensions of the gap required for particular application of o the head. By lapping off the bottom portion of the elongate member, the thin film pole piece which it carries, and the lower leg of the U including the entire step portion, a pole tip having a flat bottom surface and supported by an elongate magnetic member and spaced a fixed distance from the flux collecting tip of the U-shaped member of the head is reliably formed.

BRIEF DESCRIPTION OF THE DRAWINGS

FIG. 1 is a schematic elevational view of a magnetic head for perpendicular recording media formed in accordance with this invention;

FIG. 2 shows a perspective view of the magnetic head of this invention incorporated in a slider for positioning over the magnetic media;

FIGS. 3A–3B illustrate steps in the process of forming the magnetic head of this invention (FIG. 3A) and steps in the prior art process of forming a magnetic head (FIG. 3B);

FIGS. 3C and 3D provide comparative illustrations of the probe tips used in the present invention (FIG. 3C) and that disclosed in the incorporated Gatzen application (FIG. 3D).

DESCRIPTION OF THE PREFERRED EMBODIMENT

Figure 4:
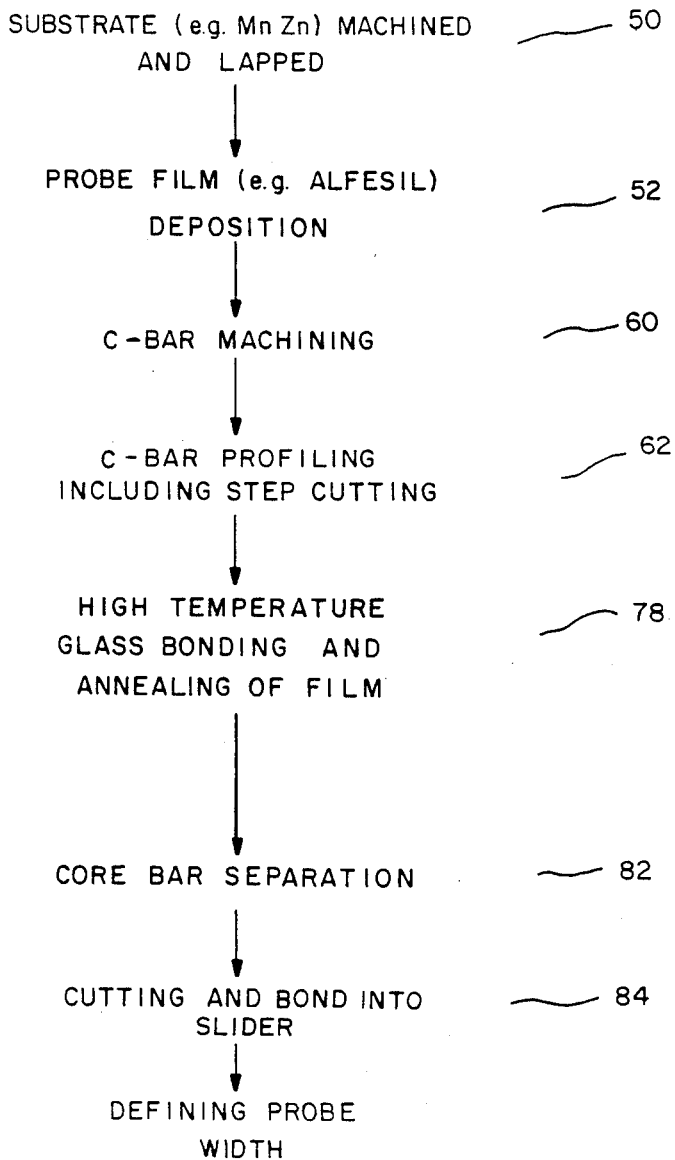
FIG 4 is a flow chart of the basic steps of forming a magnetic head in accordance with this invention.

Referring to FIG. 1, it can be seen that the head 10 is positioned over the magnetic recording media 12 which consists of a hard magnetic layer 14 with vertical orientation, a soft magnetic underlayer 16, and a substrate 18 supporting the first two layers.

The head 10, shown in a vertical section of a preferred embodiment above the magnetic media 12, includes a thin film main pole 20 comprising a thin film of magnetic material, ending in a probe tip 22 positionable above the top surface of the recording media 12. The effective length and width of this pole tip piece 22 will determine the efficiency with which bits can be packed onto the recording media. Therefore, it is an objective of this invention and a critical advantage that a flat tip 24 of such dimensions that it will magnetically saturate in the tip region during the recording process so that the thin film pole is the only high permeability material in the pole/gap region. The use of this tip 24 correctly dimensioned and the correct write current provides a very high bit packing density in the longitudinal direction, the critical recording direction in a perpendicular recording system.

The thin film main pole 20 is supported on an elongate piece of magnetic material 26. This elongate piece 26 which is made of ferrite or the like is provided to complete the magnetic circuit, as well as to support the thin film main pole. The energizing coil 30 may be mounted on this elongate magnetic piece 26 or on the back bar 32. The magnetic elongate piece 26, in addition to closing the magnetic circuit, serves to carry the magnetic flux down to the pole tip 22, to concentrate a large amount of flux at this pole tip and provide reliable reading and recording of data on the magnetic substrate.

The magnetic circuit is completed through a yoke comprising a first leg 34, the back bar 32, and a lower leg 36. As will become apparent in a discussion of the process used to form this magnetic head, the process disclosed lo herein is capable of reliably spacing the lower leg 36 across a very narrow gap 38 from the main pole tip 22. In this way, a much higher resolution data recording head is provided, without the broad pulse widths typically associated with prior efforts in this field. In use, during writing the objective is to saturate the regions 22, 37 concentrating the flux in the tip 24. The result is a probe-like effect that writes very high resolution bits on the magnetic layer. For reading, there is no saturation of the regions and the head acts like a narrow gap ring head.

The heads 10 shown in FIG. 1 are adapted to be mounted in a slider 29 shown in FIG. 2 for use in a Winchester disc drive. This slider 39 is of a type already well known in this technology, and details of its construction need not be disclosed in detail herein. The slider, the lower right-hand portion of which is shown cut away to illustrate the mounting of the magnetic head, includes air bearing surfaces 40, 42 for causing the head 10 and its recording probe tip 22 to fly just over the surface of a Winchester hard disc. The main core of the magnetic head can be preferably mounted at the trailing portion of one of the air bearing surfaces 42, as shown at the right of FIG. 2, with the trailing edge or back bar 32 exposed so that the coil 30 may be mounted thereon for energizing the magnetic circuit defined by the head 10.

The process technology for fabricating a magnetic head of this type is disclosed in detail in the incorporated application of Hans Gatzen, although some modification of that process is necessary to make the specific head disclosed and claimed herein. An outline of the process to make the head of the present invention is disclosed here with reference to FIG. 4. The major difference between the process used to form this invention and the process to form the type of heads shown in FIGS. 4A and 4B of the Gatzen application appears from a comparison of FIGS. 3A (showing the head of this invention) and 3B (showing a head of the type manufactured in the Gatzen application). The process begins by machining and lapping a magnetic substrate 50 and then depositing a probe film, Alfesil, example, on this magnetic substrate 52. This defines one of the primary differences between the present design and that disclosed in the incorporated Gatzen application. In the Gatzen application the probe is supported on a non-magnetic ceramic which makes optimization of the cutting/grinding process very difficult. The present invention provides for supporting the probe on a ferrite material, thus, making the same cutting/grinding operation to be optimized for ferrite only.

As can be seen looking at FIG. 3A, the step 50 of machining the ferrite substrate to form the substrate 54 may include cutting off the foot region 58 of the elongate piece 54 at an acute angle with the probe film 56. This foot region 58 will then be filled in with a non-magnetic material in order to provide an elongate block 59 that is longer than the finished member needs to be. The probe film 56 is then deposited (step 52) over the full length of this elongate block.

In a sequence of steps starting with a separate piece of magnetic material, a bar of magnetic material such as MZ ferrite is machined (step 60), profiled and cut (step 62) to form the back bar 64 of the finished head (shown in FIG. 3A). It will be seen that this generally U-shaped back bar 64 of magnetic material includes base member 66 which will typically be used to support the coil, and first and second legs 68, 70. One of the legs 70 has a foot 71 that will serve as the flux collector located across the gap from main pole 24. This leg 70 is formed with a step 74, this step extending out a distance equal to the desired finished gap length between back bar 64 and elongate member and probe pole 56. The base of the leg 70 also includes an unstepped portion 76 which will be filled with glass to define the finished gap.

As the next step (step 78), back bar 64 is bonded to elongate bar 54 to form a block which will eventually be cut into a plurality of heads. Glass is then flowed into the gap 76 to fix the gap length between the base of the leg 70 and the elongate ferrite bar and specifically, the probe 56 and probe tip. As annealing is temperature dependent, it is also accomplished at this time if the desired temperature is reached. The region 61 could also be filled with bonding glass at this time. After separation (step 82) of bar into cores, each core is cut and bonded (step 84) into one of a plurality of heads of the type shown in FIG. 1, after which it is lapped to define a pole width in a manner shown in the incorporated Gatzen application.

In the course of this cutting step, a cut is made across the line marked "Finished Surface" 86 in FIG. 3A. In this way, the probe pole 22 is fabricated with a flat surface indicated at 24 in FIG. 1 of very fine dimensions. This probe pole tip 24 will define the bit recording density of the finished head. The ferrite backing bar 54 for this probe pole may also include a short, flat surface 86 (FIG. 3C).

To concentrate the flux of the magnetic circuit at the probe tip 24, the region 87 in actual operation will saturate magnetically, effectively defining the magnetic length of the pole tip.

The advantages of this product over the process disclosed in the Gatzen application referred to above are that in fabrication of the product shown in FIG. 3D, a 30° angle must be formed on the ferrite with a sharp point indicated generally at 90 in order to properly concentrate the magnetic flux at the tip of the probe film supported on a non-magnetic back bar 92 was extremely difficult to achieve. No such shart point is formed in the claimed probe. Also, it is apparent from an inspection of FIG. 3B that proper alignment of the back bar 94, ferrite bar 96 and support 92 all become critical along with the machining of the sharp point 90 on the ferrite bar 96. In the present product, because of the lapping step used to form the finished head, alignment is less critical.

Finally, in the finished design provided by the design of FIG. 3D, it was expected that there would be some loss of magnetic flux between the end of the tip 90 and the end of the probe pole defined by the magnetic probe film; in the design of FIG. 3C, no such loss is expected. Thus, gin actual use the write process becomes considerably more accurate.

Other modifications of this invention may become apparent to a person of skill in the art who studies this invention disclosure. Therefore, the scope of this invention is to be limited only by the following claims.

What is claimed:

1. A read/write head for use in recording and reading data on perpendicular recording media comprising a first elongate magnetic member and a second U-shaped member having a base member and two leg members, said base member being parallel to said elongate member and said leg members being supported by and integral with said base member and extending toward said elongate member, one of said leg members being longer than the other shorter of said leg members, whereby said first elongate magnetic member and said second U-shaped member are secured together with an open gap portion defined between the other shorter leg of said second U-shaped member and said first elongate magnetic member, said gap portion being adapted to be proximate to said recording medium during use of said read/write head, said first elongate member comprising a magnetic member having an elongate layer of magnetic material carried on and extending longitudinally along a face of said first elongate magnetic member and terminating proximate said recording medium in a pole tip end having a width and thickness operable to establish the resolution of the head when said head is used for accessing said information, said first elongate magnetic member terminating in a region having a narrowed end slanted in part toward said pole tip, whereby when driven by a write current, said narrowed end of said first elongate magnetic member will saturate magnetically leaving said pole tip end as the only effective recording surface of said head.

2. A read/write head as in claim 1 wherein said pole tip end comprises a flat surface parallel to the surface of said perpendicular recording media.

3. A read/write head as in claim 2 wherein the bottom surface of said elongate magnetic member adjacent said recording medium terminates in a face inclined upwardly away from said surface of said perpendicular recording media.

4. A read/write head as in claim 3 wherein said U-shaped member comprises magnetic material, a magnetic circuit for accessing data on said media being completed through said U-shaped magnetic member, said elongate member, said pole tip end and said magnetic recording media.

5. A read/write head as in claim 4 wherein said first elongate member and said second U-shaped member define a narrow gap separating said first and second members adjacent said recording media.

6. A read/write head as in claim 5 wherein a corner of said head defined by said upwardly inclined surface is filled with a non-magnetic material, so that the end of said elongate member proximate the recording surface is mechanically protected and to avoid vacancy in the air bearing surface.

* * * * *